(12) United States Patent
Noyes

(10) Patent No.: US 9,989,635 B2
(45) Date of Patent: Jun. 5, 2018

(54) COURSE AND/OR SPEED DATA

(71) Applicant: BAE SYSTEMS plc, London (GB)

(72) Inventor: Stephen Paul Noyes, Cowes (GB)

(73) Assignee: BAE SYSTEMS PLC, London (GB)

( * ) Notice: Subject to any disclaimer, the term of this patent is extended or adjusted under 35 U.S.C. 154(b) by 214 days.

(21) Appl. No.: 14/650,107

(22) PCT Filed: Dec. 2, 2013

(86) PCT No.: PCT/GB2013/053185
§ 371 (c)(1),
(2) Date: Jun. 5, 2015

(87) PCT Pub. No.: WO2014/087143
PCT Pub. Date: Jun. 12, 2014

(65) Prior Publication Data
US 2015/0301171 A1    Oct. 22, 2015

(30) Foreign Application Priority Data

Dec. 7, 2012  (EP) ..................................... 12275194
Dec. 7, 2012  (GB) ................................... 1222063.8

(51) Int. Cl.
*G01S 13/60* (2006.01)
*G01S 13/58* (2006.01)
(Continued)

(52) U.S. Cl.
CPC .............. *G01S 13/60* (2013.01); *G01S 13/22* (2013.01); *G01S 13/589* (2013.01); *G01S 13/86* (2013.01); *G01S 13/9307* (2013.01)

(58) Field of Classification Search
CPC .......... G01S 13/02; G01S 13/50; G01S 13/58; G01S 13/589; G01S 13/60; G01S 13/62;
(Continued)

(56) References Cited

U.S. PATENT DOCUMENTS 3,717,873 A * 2/1973 Riggs .................. G01S 13/9307
                                                          342/41
3,725,918 A * 4/1973 Fleischer ............ G01S 13/9307
                                                          342/41
(Continued)

FOREIGN PATENT DOCUMENTS

EP     1965221 A1    9/2008
EP     2479585 A1    7/2012
(Continued)

OTHER PUBLICATIONS

International Preliminary Report on Patentability and Written Opinion received for Patent Application No. PCT/GB2013/053185, dated Jun. 18, 2015. 8 pages.
(Continued)

*Primary Examiner* — Bernarr E Gregory
(74) *Attorney, Agent, or Firm* — Finch & Maloney PLLC

(57) ABSTRACT

Disclosed is a method of determining a velocity of a vessel, comprising the steps of: detecting objects in the vicinity of the vessel; selecting an object having a velocity relative to the vessel which is below a predefined threshold; and determining the velocity of the vessel to be opposite to the velocity of the object. Also disclosed is an apparatus arranged to perform the method.

12 Claims, 3 Drawing Sheets

(51) Int. Cl.
*G01S 13/22* (2006.01)
*G01S 13/86* (2006.01)
*G01S 13/93* (2006.01)
*G01S 13/00* (2006.01)

(58) Field of Classification Search
CPC .......... G01S 13/88; G01S 13/91; G01S 13/92; G01S 13/93; G01S 13/9307; G01S 13/22; G01S 13/86
See application file for complete search history.

(56) References Cited

U.S. PATENT DOCUMENTS

| | | | | |
|---|---|---|---|---|
| 3,971,018 | A | * | 7/1976 | Isbister ............... G01S 13/9307 342/181 |
| 4,623,966 | A | * | 11/1986 | O'Sullivan ......... G01S 13/9307 342/182 |
| 5,515,287 | A | * | 5/1996 | Hakoyama .......... G01S 13/9307 701/301 |
| 6,304,811 | B1 | | 10/2001 | Prestl |
| 2007/0075893 | A1 | | 4/2007 | Filias et al. |

FOREIGN PATENT DOCUMENTS

| | | |
|---|---|---|
| GB | 2414356 A | 11/2005 |
| JP | 2010043960 A | 2/2010 |
| WO | 2014087143 A1 | 6/2014 |

OTHER PUBLICATIONS

International Search Report received for Patent Application No. PCT/GB2013/053185, dated Jan. 31, 2014. 2 pages.
GB Intellectual Property Office Search Report under Section 17(5) received for GB Patent Application No. 1222063.8, dated May 24, 2013. 3 pages.
Extended European Search Report received for EP Patent Application No. 12275194.4, dated May 15, 2013. 6 pages.

* cited by examiner

COURSE AND/OR SPEED DATA

FIELD

The present invention relates to the field of Radars. Specifically, it relates to the mitigation and possible correction of certain navigational data supplied to a Radar system from another system, such as ship's navigation references (course and speed made good) on board a ship or other vessel.

BACKGROUND TO THE PRESENT INVENTION

A typical ship-based Radar system will be provided with ship's navigation reference data (course and speed relative to the land) so that the apparent motion of the objects identified by the Radar on the moving ship can be compensated for the motion of the ship.

Under normal operation it may be assumed that reliable and accurate ship's course and speed data is available, but under some circumstances such as fault conditions, this data may not be available or may not be as accurate as would be expected or desired.

As such, there is a desire to improve the quality and accuracy of navigation reference data made available to the Radar.

SUMMARY OF THE INVENTION

According to an aspect of the present invention, there is provided a method of determining a velocity of a vessel, comprising the steps of: detecting objects in the vicinity of the vessel; selecting an object having a velocity relative to the vessel which is below a predefined threshold; and determining the velocity of the vessel to be opposite to the velocity of the object.

Preferably, if a plurality of objects are detected which have a velocity relative to the vessel which is below the predefined threshold, selecting the plurality of objects and calculating an average velocity for the plurality of objects.

Preferably, the step of calculating includes the step of defining an individual velocity vector for each of the plurality of objects and calculating an average velocity vector by means of the equation:

$$(x_{avg}, y_{avg}) = ((x_1+x_2+x_3+\ldots x_n)/n, (y_1+y_2+y_3+\ldots y_n)/n)$$

wherein $(x_{avg}, y_{avg})$ is the average velocity vector, n is the number of the plurality of objects, and $(x_1, y_1) \ldots (x_n, y_n)$ are the n individual velocity vectors.

Preferably, the determined velocity is compared to vessel speed and course data provided by another means, and any discrepancy is registered.

Preferably, the vessel speed and course data is corrected according to the determined velocity.

Preferably an assessment of the accuracy of the velocity measurement is made, based upon the number of stationary objects detected.

According to another aspect of the present invention, there is provided an apparatus arranged to determine a velocity of a vessel, comprising:
a signal processing unit arranged to classify Radar signals received from objects according to their relative speeds; a velocity estimation unit, arranged to identify and select from amongst the objects one whose velocity is below a predefined threshold; and a velocity processing unit, arranged to determine the velocity of the vessel to be opposite to the velocity of the one object whose speed is below the predefined threshold.

Preferably, if the slow-channel identification unit identifies and selects a plurality of objects which have a velocity relative to the vessel which is below the predefined threshold, the velocity processing unit is further arranged to calculate an average velocity for the plurality of objects.

Preferably, the velocity processing unit is arranged to calculate the average velocity for the plurality of objects by: defining an individual velocity for each of the plurality of objects; defining a vector for each individual velocity; and calculating an average velocity vector by means of the equation:

$$(x_{avg}, y_{avg}) = ((x_1+x_2+x_3+\ldots x_n)/n, (y_1+y_2+y_3+\ldots y_n)/n)$$

wherein $(x_{avg}, y_{avg})$ is the average velocity vector, n is the number of the plurality of objects, and $(x_1, y_1) \ldots (x_n, y_n)$ are the n individual velocity vectors.

Preferably, the velocity processing unit is further arranged to discount one of the individual velocity vectors before calculating an average velocity vector.

In a still further aspect, there is provided a tangible, non-transient computer-readable storage medium having instructions which, when executed, cause a computer device to perform any of the methods defined herein

BRIEF DESCRIPTION OF THE FIGURES

For a better understanding of the invention, and to show how embodiments of the same may be carried into effect, reference will now be made, by way of example, to the accompanying diagrammatic drawings in which.

DETAILED DESCRIPTION OF PREFERRED EMBODIMENT

Figure 1:
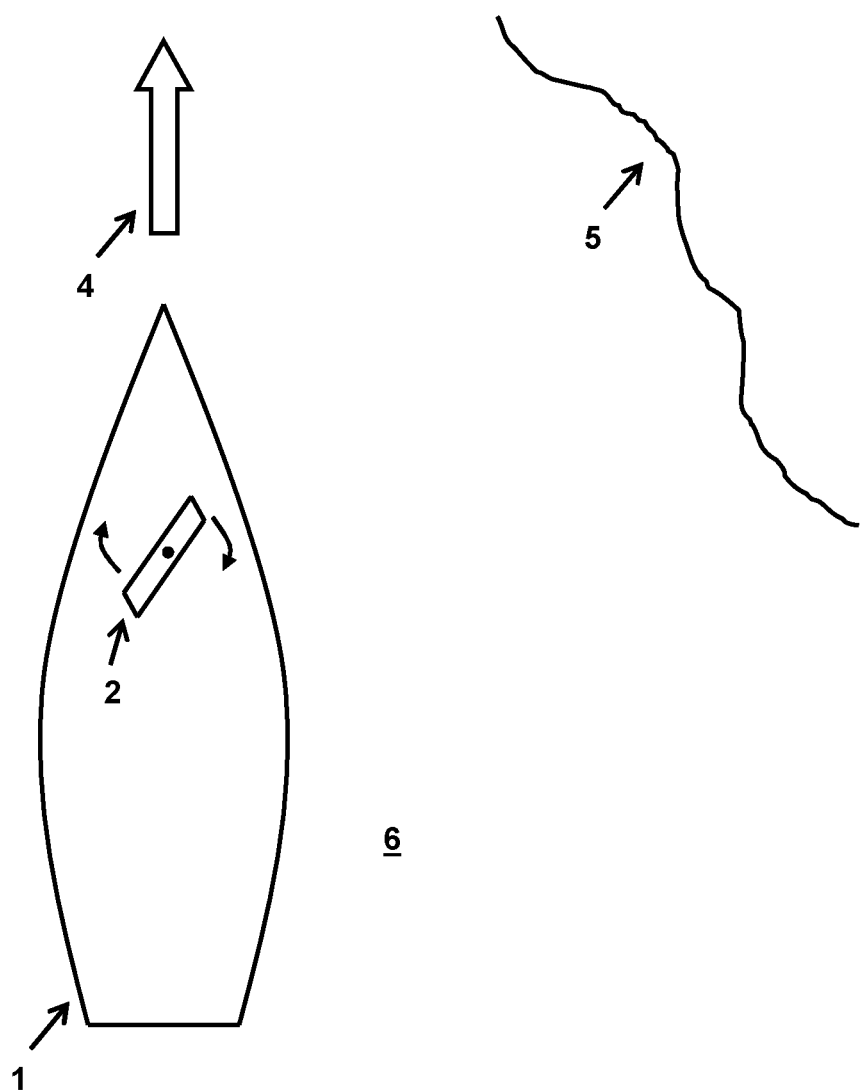
FIG. 1 shows an aerial view of a vessel provided with a Radar system.

FIG. 1 shows a representation of a vessel 1 at sea 6. In the particular setting shown here, the vessel is located in littoral zone i.e. relatively close to the coast 5.

The vessel is progressing in a direction indicated by the arrow 4 at a given speed. The vessel is equipped with a Radar system 2.

The Radar system 2 is used to identify and track objects such as aircraft, vessels or missiles. Navigation data, in the form of course and speed data from the ship is supplied to the Radar 2 so that the velocity of the objects can be adjusted for the motion of the ship and the velocity calculated over the ground.

However, the course and speed data is not always as reliable as would be desired, and so embodiments of the present invention utilise information derived from the Radar to derive course and speed data. This derived course and speed data may be used to define a correction factor which can be applied to the supplied course and speed data, or it may simply be presented to an operator for information purposes.

A problem encountered in most Radar system is the detection and subsequent handling of signals which are not of interest. Such returns are usually referred to as clutter and can be detected from nearby stationary objects, slow moving debris, such as flotsam and jetsam, wave tips or other nearby vessels. Normally, steps are to taken to minimise the effect of clutter, but embodiments of the present invention make use of clutter in order to infer information on the course and speed of the vessel.

When the Radar 2 scans, the return signals are filtered and processed to provide range information and also speed information. Radar returns from slow targets of no interest, such as those from nearby stationary objects, are suppressed.

Figure 2:
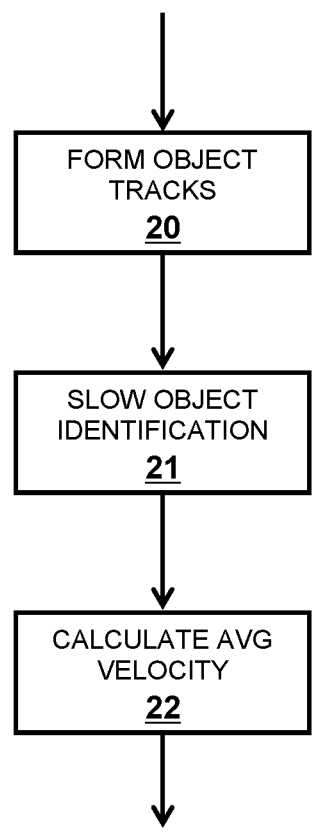
FIG. 2 shows a flowchart according to an embodiment of the present invention.

FIG. 2 is a flowchart which shows the steps taken in an embodiment of the invention. Step 20 is the formation of tracks on objects detected by the radar, to determine their velocity relative to the ship.

For the purposes of this explanation, it is important to realise that speed and velocity are different, even though they are commonly used interchangeably. Speed is a scalar quantity i.e. it has no directional component, whereas velocity is a vector quantity which represents speed and direction. Unless stated otherwise, embodiments of the present invention are concerned with velocity i.e. course (direction) and speed, together.

By identifying the stationary or slow moving clutter, an inference can be made of the velocity of the vessel. That is, objects that appear stationary when the vessel is moving are actually only relatively stationary i.e. they have the same velocity as the vessel, and so appear not to be moving. In a littoral environment, most of the slow moving objects detected are likely to be absolutely stationary and appear to be slow-moving due to the velocity of the vessel, which is moving away from or towards them.

Step 21 is the slow object identification. Here, any returns having a speed greater than a defined threshold are discarded from this process and only slow or stationary targets are considered.

In practice the truly stationary objects cannot be identified from the slow moving object without a knowledge of ship motion. But, by assuming that in a littoral environment most of the objects tracked will be from stationary objects, then an estimate for the velocity of the ship can be made. For instance, if the returns appear to be moving away from the vessel at a speed X at a heading of 30°, the speed of the vessel is calculated to be X at a heading of 210°.

It is necessary to define an average velocity for all the returns received at the Radar, so that this can be used as the basis for inferring the velocity of the vessel. Straightforward vector mathematics allows a simple average to be defined. For the sake of example, consider the case where three returns are detected. These can be represented in a vector fashion using their Cartesian or (x,y) co-ordinates, with the vessel itself positioned at the origin (0,0). The three vectors are $(x_1, y_1); (x_2, y_2); (x_3, y_3)$. The average vector is defined as: $(x_{avg}, y_{avg})=((x_1+x_2+x_3)/3, (y_1+y_2+y_3)/3)$. Of course, the same method can be used for any number of vectors, with the generic situation being defined as:

$$(x_{avg}, y_{avg})=((x_1+x_2+x_3+\ldots x_n)/n, (y_1+y_2+y_3+\ldots y_n)/n)$$

This vector mathematics is performed in step 22.

In order to eliminate any outlying values measured, either in terms of speed or direction, one or more thresholds may be applied to the detected returns to remove any potentially erroneous readings.

The threshold or thresholds may be applied dynamically. That is, instead of using a fixed value of speed or direction above or below which any readings will be ignored, the threshold or thresholds may change in real time. One possible way of doing this is to statistically analyse the results and to discount any results which lie more than a defined number of standard deviations from a mean. In this way, a more reliable figure for the vessel's velocity may be determined.

In this way, if the majority of returns indicate a certain general direction, but one or two are clearly in a different direction, the one or two that do not conform to the majority may be discounted.

Once the velocity of the vessel has been determined as set out above, there are several possible uses for this information. It may be used to double check the information provided from the navigation system. In that case, it may simply be displayed to the operator, alongside the information from the navigation system. It may also be fed back to the navigation system, again as a double check.

In a more adaptive system, the velocity information supplied from the navigation system can be modified according to the velocity determined according to an embodiment of the invention, in an attempt to give a more accurate reading.

Figure 3:
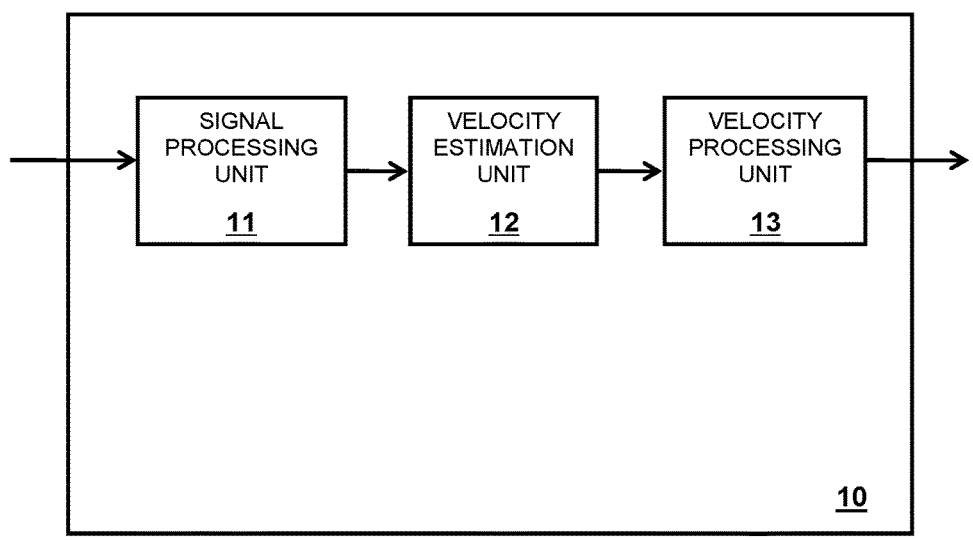
FIG. 3 shows an apparatus according to an embodiment of the present invention.

FIG. 3 shows a schematic of an apparatus arranged to perform the method set out above. The apparatus 10 forms part of the processing system for the Radar 2.

The apparatus 10 comprises a signal processing unit 11. This is arranged to receive an input from the Radar receiver circuitry. The signal processing unit processes the received signals to identify objects detected by the Radar.

The results of this unit are passed to a velocity estimation unit 12. This unit identifies only those target returns which are stationary or slow, according to a defined threshold. Targets having a speed above the defined threshold are discarded from this process.

Information on the identified slow and stationary targets is then passed to the velocity processing unit 13. This performs the vector mathematics described previously to infer the velocity of the vessel. This unit also performs any pruning of the data which may be required to remove outlying data samples which could skew the result in an undesirable manner.

The output from the velocity processing unit 13 is information on the velocity i.e. course and speed of the vessel, derived from certain measured Radar return signals.

The output signal can be used to drive a display unit so that an operator is made aware of the inferred velocity information. Alternatively, the calculated velocity can be compared to the velocity information supplied by the navigation system and may be used to correct it, or at least to flag to an operator that there is a discrepancy. This may be subject to a threshold so that small differences between the navigational data and the calculated data are ignored.

Embodiments of the invention may be arranged to operate in different modes, depending on the relative position of the vessel. For instance, if the vessel is operating in the littoral zone, there is likely to be more stationary clutter than would be the case in open ocean conditions. A small number of stationary returns could cause erroneous determinations of vessel velocity to be made, but recognition of such circumstances may be automated by methods such as setting a threshold on the minimum number of stationary objects that must contribute to the velocity estimate.

Embodiments of the invention are able to make use of clutter data from a Radar, which would normally be discarded or of little interest in the normal operation of such a system, and use the data to derive information on the vessel's velocity. This information can be advantageously used to flag possible issues with the navigational data provided to the crew. It can additionally be used to correct said navigational data, if desired.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed:

1. A method of determining a velocity of a vessel, the method comprising:
    detecting at least one object using a Radar signal received from a Radar system operable to track a position of the at least one object relative to the vessel, the Radar signal including clutter representing stationary objects and objects moving below a predefined threshold speed;
    calculating, using only the clutter in the Radar signal, an apparent velocity of the at least one object relative to the vessel based on the tracked position of the at least one object, the apparent velocity being an apparent speed of the at least one object relative to the vessel and an apparent direction of the at least one object relative to the vessel; and
    calculating the velocity of the vessel based on the apparent velocity of the at least one object, wherein the calculated velocity of the vessel is the apparent speed of the at least one object and a direction opposite to the apparent direction of the at least one object.

2. The method of claim 1, further comprising detecting a plurality of objects using the Radar signal, wherein the apparent velocity of the at least one object is an average of the apparent velocity of each of the plurality of objects relative to the vessel.

3. The method of claim 2, wherein the calculating of the velocity of the vessel includes defining an individual velocity vector for each of the plurality of objects and calculating an average velocity vector by means of the equation:

$$(x_{avg}, y_{avg}) = ((x_1 + x_2 + x_3 + \ldots x_n)/n, (y_1 + y_2 + y_3 + \ldots y_n)/n)$$

wherein $(x_{avg}, y_{avg})$ is the average velocity vector, n is the number of the plurality of objects, and $(x_1, y_1) \ldots (x_n, y_n)$ are the n individual velocity vectors.

4. The method of claim 3, wherein at least one of the individual velocity vectors is discounted before the average velocity vector is calculated.

5. The method of claim 4, wherein the at least one individual velocity vector is discounted on the basis of a statistical analysis of the plurality of objects.

6. The method of claim 1, wherein the determined velocity is compared to vessel speed and course data provided by another means, and any discrepancy beyond a given threshold is registered.

7. The method of claim 6, wherein the vessel speed and course data is corrected according to the determined velocity.

8. The method of claim 1, wherein an assessment of the accuracy of the velocity measurement is made based upon the number of stationary objects detected.

9. An apparatus arranged to determine a velocity of a vessel, the apparatus comprising:
    a signal processing unit configured to detect at least one object using a Radar signal received from a Radar system operable to track a position of the at least one object relative to the vessel, the Radar signal including clutter representing stationary objects and objects moving below a predefined threshold speed;
    a velocity estimation unit configured to calculate, using only the clutter in the Radar signal, an apparent velocity of the at least one object relative to the vessel based on the tracked position of the at least one object, the apparent velocity being an apparent speed of the at least one object relative to the vessel and an apparent direction of the at least one object relative to the vessel; and
    a velocity processing unit configured to calculate the velocity of the vessel based on the apparent velocity of the at least one object, wherein the calculated velocity of the vessel is the apparent speed of the at least one object and a direction opposite to the apparent direction of the at least one object.

10. The apparatus as claimed in claim 9, wherein the velocity estimation unit is further configured to detect a plurality of objects using the Radar signal, and wherein the apparent velocity of the at least one object is an average velocity of each of the plurality of objects relative to the vessel.

11. The apparatus as claimed in claim 10, wherein the velocity processing unit is further configured to calculate the average velocity for the plurality of objects by:
    defining an individual velocity for each of the plurality of objects;
    defining a vector for each individual velocity; and
    calculating an average velocity vector by means of the equation:

$$(x_{avg}, y_{avg}) = ((x_1 + x_2 + x_3 + \ldots x_n)/n, (y_1 + y_2 + y_3 + \ldots y_n)/n)$$

wherein $(x_{avg}, y_{avg})$ is the average velocity vector, n is the number of the plurality of objects, and $(x_1, y_1) (x_n, y_n)$ are the n individual velocity vectors.

12. The apparatus as claimed in claim 11, wherein the velocity processing unit is further configured to discount one of the individual velocity vectors before calculating an average velocity vector.

* * * * *